United States Patent [19]
Orlando

[11] 3,790,741
[45] Feb. 5, 1974

[54] METHOD FOR FABRICATING A THREADED STUD IN A BATTERY POST

[75] Inventor: Daniel Orlando, New Berlin, Wis.

[73] Assignee: Globe-Union Inc., Milwaukee, Wis.

[22] Filed: Jan. 8, 1973

[21] Appl. No.: 321,824

[52] U.S. Cl. .............. 219/107, 136/135 S, 219/85
[51] Int. Cl. ...................... H01m 5/00, B23k 11/02
[58] Field of Search ................. 219/85, 98, 99, 107; 136/135 S

[56] References Cited
UNITED STATES PATENTS

| | | | |
|---|---|---|---|
| 2,049,101 | 7/1936 | Baker............................ | 219/85 |
| 2,321,368 | 6/1943 | Dodkin et al................... | 219/85 |
| 2,173,670 | 9/1939 | Splaine......................... | 219/85 X |
| 2,332,261 | 10/1943 | Rohrbach....................... | 219/85 X |
| 3,644,149 | 2/1972 | Coffey.......................... | 136/135 S |

*Primary Examiner*—J. V. Truhe
*Assistant Examiner*—Hugh D. Jaeger
*Attorney, Agent, or Firm*—Neil E. Hamilton; John Phillip Ryan

[57] ABSTRACT

A threaded stud is secured in a battery post fabricated from the usual lead alloys by simultaneously applying a force and welding current to the threaded member so as to melt portions of the lead post while forcing the threaded member into the post. The force and the welding current are controlled in such a manner to prevent overheating of the stud and arcing of welding current. This control can be effected by the intermittent application of welding current with constant application of force on the stud. In one embodiment, the post is provided (preferably by drilling) with a slightly undersized passage and in an alternative embodiment, a hollow, threaded member is utilized without providing the passageway. An apparatus is also described for driving and welding the threaded member into the post which allows for intermittent welding and driving as well as a combined positioning and welding electrode member for the threaded stud and battery post.

14 Claims, 5 Drawing Figures

PATENTED FEB 5 1974　　　　　　　　　　　　　　3,790,741

METHOD FOR FABRICATING A THREADED STUD IN A BATTERY POST

BACKGROUND OF THE INVENTION

This invention relates to the securing of a threaded stud in a supporting post. More particularly, it relates to a method and apparatus for simultaneously applying a driving force and welding current to a metallic threaded member so as to effectively secure it in a battery post composed primarily of lead, without damage to the threads.

In the usual stud in terminal post construction for a lead acid battery, the stud is inserted into the post as the post is being built-up. This entails the placing of a mold over the lead bushing which surrounds the sub-post structure and is in contact with the top of the container. As lead is melted into the mold, the threaded member is centrally positioned and the lead is caused to flow around it and to secure it in the post. This method of fabrication is expensive and requires a constant operator's attention in order to assure that a secure connection is effected and that the threaded stud is in alignment with the post.

It is an object of the present invention to provide a novel process and apparatus for fabricating a threaded stud member in a supporting post which eliminates the prior post build-up technique and with positioning of the post member during the build-up procedure. It is another object of this invention to provide a method and apparatus for securing a threaded stud member into a finished post member which can be effected without requiring constant operator attention during the process. It is still another object of this invention to provide a method and apparatus for securing a threaded stud member in a battery post which method is easily and efficiently performed and the apparatus adapted for use in assembly line procedures.

SUMMARY OF THE INVENTION

The foregoing objects and the shortcomings of the prior art are overcome by the present method and apparatus wherein a threaded member is driven by means of force and simultaneous welding current into a post. The force and, consequently, the welding current is applied so as to prevent overheating of the threaded member which can result in a bending of the stud, melting away of the threads and jamming of the electrodes. This is accomplished by utilizing intermittent welding current. In one embodiment, a preformed hole which is undersized is provided in the post and the threaded member is forced with simultaneous welding current into the undersized hole. In another embodiment, a hole is not previously provided but, instead, a hollow, threaded stud member is forced by means of force and intermittent welding current into the post member. An apparatus is provided for accomplishing this method wherein a combined welding electrode and driving member is provided to contact one end of the threaded member while another electrode, by means of a positioning member for the other end of the threaded stud, surrounds the post and retains the stud in an upright manner as well as supplies the necessary flow of current during the time the force is applied to the threaded stud. A pair of electrodes and driving members are interconnected by common controls so that the battery need be positioned only once for driving both stud members into the negative and positive posts. Means are provided to supply fluid power to the driving members and electrical current to the electrodes.

BRIEF DESCRIPTION OF THE DRAWINGS

A better understanding of the present process and the apparatus for accomplishing it will be afforded by reference to the drawing wherein.

DESCRIPTION OF THE PREFERRED EMBODIMENT

Figure 1:
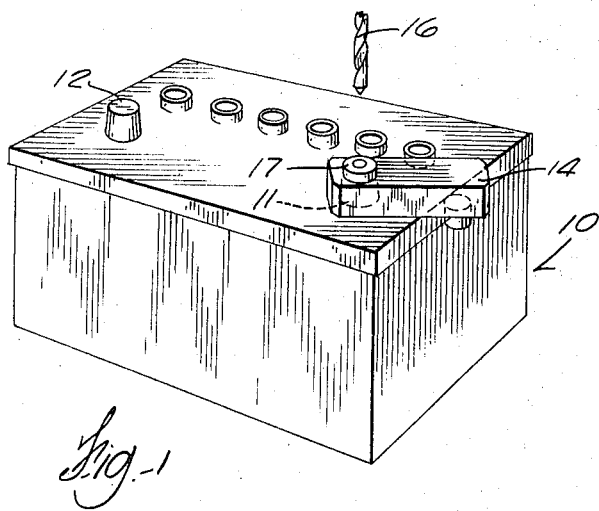
FIG. 1 is a perspective view of a battery with a drill jig placed over one of the terminals and a drill positioned for providing a hole in the post.

A conventional lead acid battery with the usual outwardly projecting posts or terminals is utilized and, preferably, a drill bit is employed to provide a central hole or passage in the post which is composed of a standard lead alloy. Preferably, this hole will be drilled from 7/16 to ½ inch deep in each of the terminals using a drill bit of approximately one fourth inch diameter. After the holes are drilled in the terminals, a threaded, lead coated brass stud of five sixteenths inch diameter and fifteen sixteenths inch long is oriented with the hole in contact with the upper wall surface forming the passage. The welding electrodes of an alternating current type welder which will supply at least 3 ½ volts of alternating current are attached, one to the battery post and the other to a driving cylinder which will contact the portion of the threaded stud opposite to that in contact with the wall surface of the passage in the post. A force of approximately 100 lbs is applied to the threaded post while the welding current is simultaneously supplied. The simultaneous application of welding current and force is effected for approximately six to ten cycles and then interrupted for approximately two cycles. The welding current is subsequently applied for the same period with subsequent interruption while a constant force is applied. This sequence is continued for six to ten times until the stud is placed in a post approximately half of its length or until one half inch of the threaded stud remains above the post. The total time will take approximately 46 to 118 cycles. The purpose of interrupting the welding current is to allow current turn off at point where the stud is driven down to bottom position in the passage or when the driving electrode surface strikes the surface of the other stationary electrode. After the threaded post is driven into the hole a sufficient distance, the procedure is repeated in conjunction with the other post. This is done to keep the electrical power requirements at a reduced level. After both threaded members are driven the indicated distance into the post, the usual burning dams are placed over each terminal and with an appropriate burning torch and tip, the threaded stud member is sealed to the post surface.

DESCRIPTION OF AN ALTERNATIVE EMBODIMENT

The welding and driving steps with the stated conditions as indicated in the previous paragraph are employed when a hollow, threaded member is simultaneously heated by the welding current and driven into the post. In such instance, it is not necessary to provide the opening in the post such as by drilling but the hollow member is oriented by means of a jig and the hollow, threaded member forced into the leaded post as the molten lead flows up into the hollow core.

Test data indicates that tensile and torque tests on the welded stud are greater than a stud inserted by a drilling and tapping operation. For example, when the drill and tap method was employed, the stud withstood a pulling force of 1,020 pounds as compared to 1,211 pounds for the welding method as previously described and 1,325 pounds for the described welding step in conjunction with the subsequent burning operation. A second tensile strength test was performed on the post and the stud combined. When the drill and tap process was employed 880 pounds of force were required to break the post as compared to 1,116 pounds for the weld procedure of this invention. Torque tests showed a 99 pound average for those studs which were drilled and tapped as compared to 132.5 pounds for those welded and burned and 113 pounds for welding, according to this invention.

Figure 2:
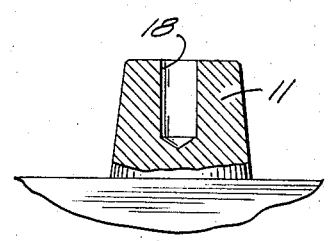
FIG. 2 is a partial view in vertical section showing the hole after it is drilled in the post pursuant to the FIG. 1 description.

An apparatus which can be advantageously employed for performing the method of this invention is shown in the drawing. In FIG. 1, a standard lead acid battery generally 10 is described having the usual positive and negative post terminals 11 and 12. A drill jig 14 is described in place over the positive terminal 11 and a drill bit 16 is oriented for engagement with the post 11 through opening 17 of jig 14 to result in a passage 18 such as described in FIG. 2. A combined jig and welding electrode is described in FIGS. 3 and 4 by the numeral generally 20 and has an upper hard rubber portion 19 and a lower metallic section 27 for conveying current to post 11. This electrode 20 is placed over and surrounds the post terminal 11. A threaded stud member 22 is inserted through an accommodating aperture 21 so as to be oriented with passage 18. It will be noted that the combined jig and electrode 20 is attached to terminal 23 of cable 24 and the other cable 25 is electrically connected to driving electrode cylinder 26 by means of terminal 28 and flange 29 on the cylinder. Pneumatic cylinder 30 supplies the force for moving the driving electrode 26 upwardly and downwardly. It is supplied with air through the usual conduits 32 and 33 and the air to and from these conduits is controlled by air control valve means 35 via control lever 36. Positioned above the pneumatic control 35 is a weld switch box 40 with a switch button 41 for starting a timer (not shown) which intermittently controls the current to welding terminals 23 and 28. A standard weld transformer 44 is employed for supplying current to cables 25 and 24 as well as cables 124 and 125 for a second companion welding unit wherein similar parts are numbered in the "100" series. The electrodes 26, 126 and fluid driving means 30, 130, respectively, are supported in a side-by-side relationship by means of common frame 49.

Figure 3:
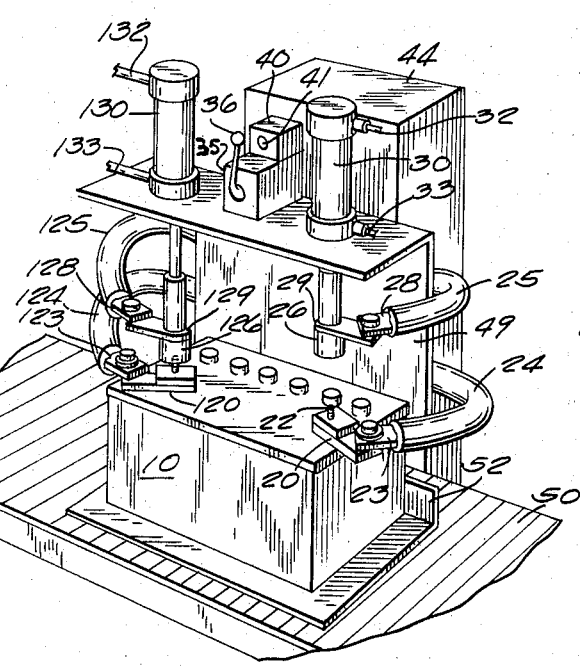
FIG. 3 is a perspective view showing the preferred apparatus for accomplishing the process of this invention and indicating one of the combined driving and electrode members forcing the threaded stud into the post while the other driving and welding electrode is in an upright position.
Figure 4:
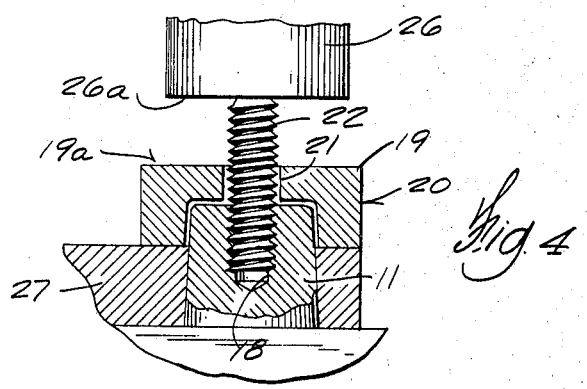
FIG. 4 is a partial view in vertical section showing the threaded stud engaged by the driving member as it is driven through the passage in the post.

As shown in FIG. 3, the battery 10 is conveyed to a position where the posts 11 and 12 are oriented with cylinders 26 and 126 by a conveyor 50 with battery 10 riding upon a palate 52. With the battery 10 positioned as shown in FIG. 3, the combined jig and welding electrodes 20 and 120 will be placed over battery posts 11 and 12 and the threaded studs such as shown at 22 will be placed in the top portion 19 of the combined jig and welding electrodes 20, 120. Control lever 36 will be turned to an appropriate position so as to cause electrode cylinder 26 to move downwardly and rest upon the end of stud 22 opposite to its engagement with the surrounding wall surface of passage 18. When the cylinder contacts the stud 22, the weld switch 41 will be actuated which will cause current to flow between electrode jig 20 and electrode 26 to thereby cause current to flow through the stud 22 and effect a melting of a portion of the post 11 and cause lead to flow around the threads. Welding control 40 is so designed to effect a welding cycle of from six to ten cycles utilizing approximately 3 ½ volts AC with 100 percent heat. This cycle will be repeated automatically approximately six to ten times to drive the stud into the post until the end 26a of electrode 26 contacts the rubber surface 19a of the upper portion 19 of jig 20 which stops current flow. At this point, approximately 1/2 inch of the threaded stud will remain outside the post 11 and within upper jig portion 19.

Figure 5:
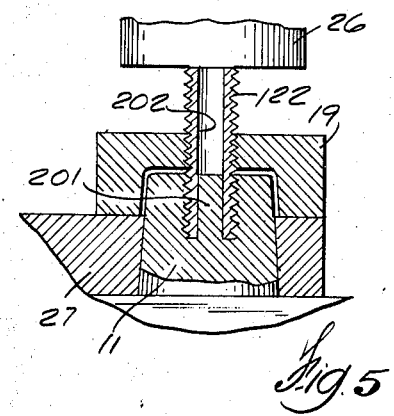
FIG. 5 is a partial view in vertical section showing an alternative embodiment of the invention wherein a hollow, threaded member is employed.

Referring to FIG. 5, a hollow, threaded stud 122 is shown while being driven according to the previously described procedure into post 11 but without the previously provided passage such as 18. All of the previously described welding conditions will apply generally. However, in this particular procedure, molten lead such as shown at 201 will flow up the inside 202 of the hollow stud 122. Lead will also flow around the external threads in the same manner as described in FIG. 3 for threaded stud 22.

In the previous description, a lead plated brass stud is described as being welded into a lead alloy post. In place of brass, other studs composed of metals such as copper could be employed and other lower melting metals and alloys thereof could be substituted for the lead post. The size of the stud is not of importance as long as sufficient material remains in the post to anchor the stud after it has been driven and welded into it. A current of 3 ½ volts AC with a force of approximately 100 lbs has been indicated as the preferred welding and driving force conditions. However, this could be varied to be as little as three volts and as high as five volts and with a force in the range of 80 to 100 lbs. Intermittent application of welding current is utilized as a means of controlling the current so as not to over heat the threaded stud 22 and to prevent arcing of the welding current when the surface 26a of the driving electrode 26 is no longer in driving engagement with stud 22. Such arcing can cause damage to the threaded stud 22. In place of the intermittent application of welding current, suitable controls could be employed to regulate the welding current and also to turn off the current when the stud 22 has been driven into the post 11 a prescribed distance. It should be pointed out that over heating of the stud can melt the threads as well as cause a bending. This bending could cause an undesired jamming of the bottom electrode 20 in that the bent stud would prevent removal from post 11 or melted metal could solidify between the stud and upper portion 19 of jig 20.

It will thus be seen that through the present invention, there is now provided a quick and efficient manner for securing a threaded stud member into a post which requires a minimum of operator supervision. The resulting threaded stud is secured in such a manner that it exceeds the tensile and torque strength tests of a threaded post which is drilled and tapped. The apparatus of this invention is highly adaptable to assembly line conditions and can be operated without special training.

The foregoing invention can now be practiced by those skilled in the art. Such skilled persons will know that the invention is not necessarily restricted to the particular embodiments presented herein. The scope of the invention is to be defined by the terms of the following claims as given meaning by the preceding description.

I claim:

1. A method of securing a threaded stud in a solid battery post comprising providing in said post a passage extending a substantial distance into said post, axially aligning a threaded member with said passage with one end in contact with said passage, said passage having an average diameter less than that of said threaded member, applying a linear force to an other end of said threaded member while simultaneously applying and controlling welding current between said post and said threaded member stopping the current at precisely the point at which the stud reaches a predetermined position whereby over heating of the stud and arcing of the welding current is avoided.

2. The method as defined in claim 1 wherein said welding current is applied in an intermittent manner and said force is constantly applied.

3. The method as defined in claim 1 wherein said passage is provided in said post by a drilling step.

4. The method as defined in claim 1 wherein said threaded member is provided with threads extending substantially along its entire length.

5. The method as defined in claim 1 further including the step of burning said thread stud to a surface of said post.

6. The method as defined in claim 1 wherein said welding current is applied around said post and said force and welding current are applied at the other end of said threaded member.

7. The method as defined in claim 1 wherein said post member is fabricated from a lead alloy and said threaded member is fabricated from lead coated brass.

8. The method as defined in claim 1 wherein said steps of providing said passage, aligning said threaded member, applying said force and welding current and interrupting said current are performed sequentially on two different posts of the same battery.

9. A method of securing a threaded stud in a solid battery metal post comprising positioning a hollow, threaded member with one end in contact with said post and simultaneously applying a linear force and welding current to an other end of said member and welding current to said post to melt portions of said post to effect a flow of post metal into the inside of said threaded member while said threaded member is forced linearly into said post.

10. The method as defined in claim 9 wherein said welding current is applied in an intermittent manner to effect precise current shut off at a predetermined position of the stud.

11. The method as defined in claim 9 wherein said post is fabricated from a lead alloy and said threaded member is fabricated from lead coated brass.

12. The method as defined in claim 9 wherein said welding current is applied around said post and said force and welding current are applied to said threaded member at said other end opposite to that initially contacting said post.

13. The method as defined in claim 9 wherein said threaded member is provided with threads extending substantially along its entire length.

14. The method as defined in claim 9 wherein said steps of positioning said threaded member with one end in contact with said post and simultaneously applying force and welding current are performed sequentially on two different posts of the same battery.

* * * * *